Patented June 13, 1939

2,161,857

UNITED STATES PATENT OFFICE 2,161,857

BRANCHED CHAIN OCTYL SULPHATES

Joseph G. Davidson, Scarsdale, N. Y., assignor to Carbide and Carbon Chemicals Corporation, a corporation of New York No Drawing. Application December 28, 1936, Serial No. 117,920

11 Claims. (Cl. 260—459)

This invention is directed to a group of new chemical compounds having unusual ability to depress surface tensions of aqueous solutions, and the invention broadly includes the sulphuric acid esters of branched chain octyl alcohols and salts thereof.

The use of agents capable of lowering the surface tensions of aqueous solutions for accomplishing such operations as cleaning, foaming, wetting of textile fibers for processing, and the like, is well known, and the most familiar agents for these purposes are soaps, or alkali metal salts of higher fatty acids. Other salts of various higher fatty acids have been prepared which are capable of modifying or reducing surface tensions of aqueous solutions to a greater degree than soaps, and so in many cases have replaced the latter in uses where powerful detergents, foaming agents, or textile wetting agents are required.

This is particularly true of the wetting agents employed to decrease the interfacial tension between aqueous processing solutions and textile fibers. Since textile processing solutions vary widely from the acidity of dyeing and carbonizing media to the high alkalinity of a mercerizing liquor, and from low temperatures (as in certain dyeing operations) to boiling under pressure (kier boiling), no single wetting agent is suitable for all applications, and wetting agents usually are found most efficient under one limited set of conditions. Soaps are not suitable in calcareous or acidic solutions, sulphonated fatty oils are not applicable in strongly acid or alkaline liquors, and not all sulphated fatty alcohols are stable in highly alkaline mercerizing baths.

It is an object of this invention to provide certain new chemical substances which are adapted for use as interface modifying agents and which are applicable to aqueous solutions for which soaps are unsuitable.

It is a further object of this invention to provide substances which are improved wetting agents for textile fibers.

Other objects of the invention will be apparent from the following description.

The improved products of this invention are sulphuric acid esters of branched chain octyl alcohols, and in particular, sulphate esters of an ethyl hexanol wherein the sulphate group may have an ionizable hydrogen atom or may be neutralized with an organic or inorganic neutralizing medium. The preferred product of this invention is a sulphate ester of 2-ethyl hexanol-1 and the soluble or colloidally dispersible salts thereof.

The following examples are typical of the preparation of 2-ethyl hexyl sulphate and its salts.

Example I 1200 parts by weight of concentrated sulphuric acid were added slowly to 500 parts by weight of 2-ethyl hexanol-1 while the temperature was maintained between 5° and 10° C. The addition required two hours, and the mixture was stirred for three hours at 15° to 20° C. Upon standing it separated into an orange colored oily layer and a relatively small, colorless, acid layer. The total product was mixed with 1300 parts by weight of ice, and the aqueous acid and oil layers separated. The oil layer was then extracted with 650 parts by weight of diethyl ether to produce an extract containing the total free and sulphated alcohol. The ether and unreacted alcohol were distilled from the 2-ethyl hexyl sulphate.

Example II

Part of the ether extract from Example I was treated with 40% caustic soda solution keeping the temperature below 30° C., and using phenolphthalein to indicate when the acid was neutralized. The sodium sulphate precipitated from the ethereal solution and was separated by filtration. The remaining ethereal solution was extracted with petroleum ether to remove unreacted alcohol leaving an ether solution of sodium 2-ethyl hexyl sulphate and some water which was evaporated under vacuum at room temperature. In order to remove the last traces of the ether and water, the residue was spread in flat pans and dried in an oven at about 60° C.

The sodium 2-ethyl hexyl sulphate is a light colored soap-like product, very viscous and almost flaky. It is soluble in water in all proportions yielding clear, non-viscous solutions. The addition of calcium chloride to its solutions does not cause a precipitate or affect its foaming power. It is a good coupling agent since its concentrated water solutions take up ether, benzene, and similar water immiscible liquids to form clear solutions, and these may be emulsified with additional water. The soap is soluble in ethyl ether and alcohol, but not in hydrocarbons.

The invention is not limited to the use of a particular base for neutralizing the acid alkyl sulphate, and any basic reacting substance may be used as a source of the cation to replace the hydrogen atom on the sulphate radical. Especially useful products included within this invention are the amine salts of the sulphuric acid ester of 2-ethyl hexanol-1. In particular, the triethanolamine salt, which is a liquid at room temperature, can be used to advantage in many industries.

In all cases the neutralization of the acid octyl sulphate may be carried out as given above, or by any of the well known methods. The products may be produced either in the form of aqueous pastes or solutions, or as anhydrous materials.

The sulphation of the octyl alcohol need not be carried out with sulphuric acid, but may be accomplished by other reagents, such as chlorsulphonic acid and sulphonyl chloride, according to known methods.

Although the compounds described herein are derivatives of 2-ethyl hexanol-1, it is evident that the invention should not be so limited. Other branced chain alcohols may be sulphated in similar manner wherein the branched chain may be on the 3rd, 4th or 5th carbon atom, and the hydroxyl group may be on a carbon atom other than the first in the chain. However, in all cases the alcohol is an octyl alcohol, or an aliphatic alcohol having eight carbon atoms.

Many variations will be apparent to those skilled in the art, and the invention should not be limited except as defined by the appended claims.

I claim:

1. A sulphuric acid ester of a branched chain octyl alcohol.

2. A sulphuric acid ester of a branched chain octyl alcohol wherein the sulphate group is neutralized with an alkaline reacting substance.

3. An alkyl sulphate having the formula $$R.O.SO_3.X$$

wherein "R" is an ethyl hexyl radical and "X" is an amine radical.

4. An alkyl sulphate having the formula $$R.O.SO_3.X$$

wherein "R" is an ethyl hexyl radical and "X" is a cation.

5. A sulphuric acid ester of 2-ethyl hexanol-1.

6. An alkyl sulphate having the formula

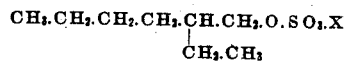

wherein "X" is a cation.

7. An alkyl sulphate having the formula

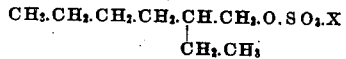

wherein "X" is an amine radical.

8. Process of making a sulphate ester of a branched chain octyl alcohol wherein a branched chain octyl alcohol is reacted with a sulphating agent to produce an acid sulphate ester of the octyl alcohol, and the acid sulphate ester is neutralized with a basic reacting substance.

9. Process of making a sulphuric acid ester of a branched chain octyl alcohol wherein a branched chain octyl alcohol is treated with concentrated sulphuric acid, the products of reaction diluted with water, the water-immiscible layer containing the octyl ester separated from the aqueous acid layer and extracted with diethyl ether, and the ether and unreacted alcohol removed from the octyl ester.

10. Process of making a salt of a branched chain octyl sulphate wherein a branched chain octyl alcohol is reacted with concentrated sulphuric acid, the products of reaction diluted with water, the water-immiscible layer separated and neutralized with a basic reacting substance, the mixture extracted with pretroleum ether, and the ether removed from the octyl sulphate salt by evaporation.

11. As a wetting agent for textile fibers, an alkyl sulphate having the formula R—O—SO₃—X wherein "R" is a branched chain octyl group, and "X" is a cation.

JOSEPH G. DAVIDSON.